Aug. 28, 1934.  T. N. PIERSON  1,972,031
STRAW RETARDER
Filed Feb. 11, 1929
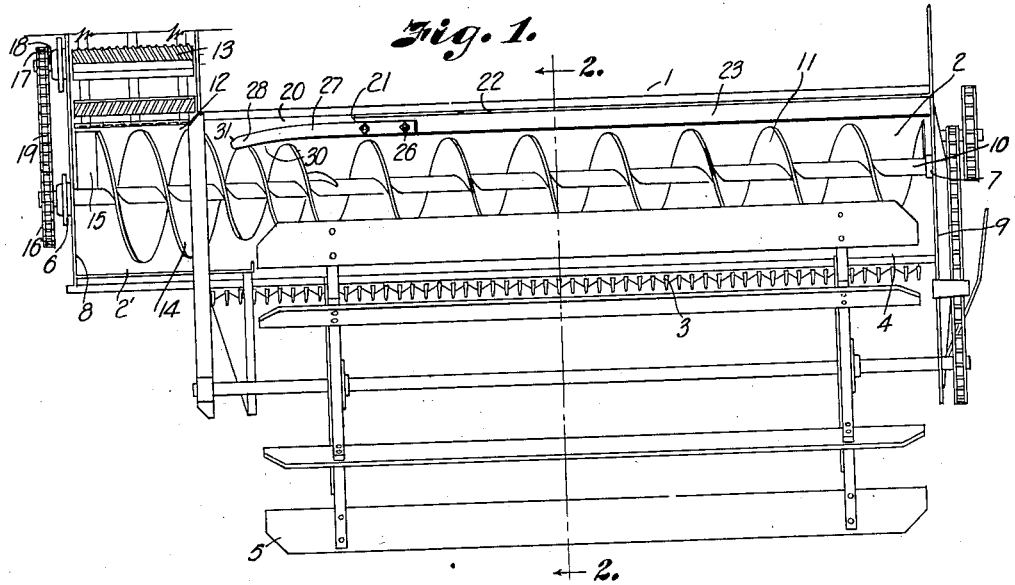
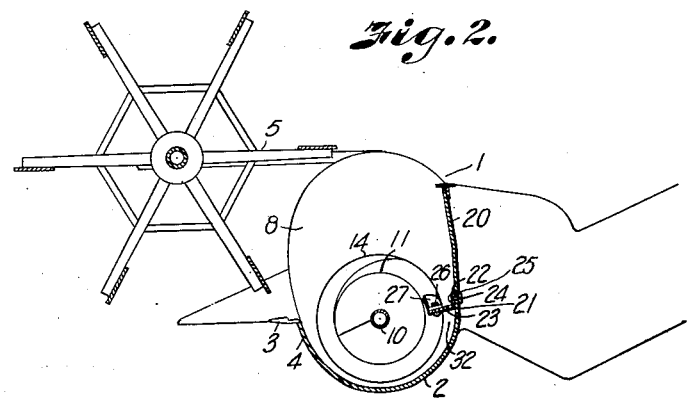
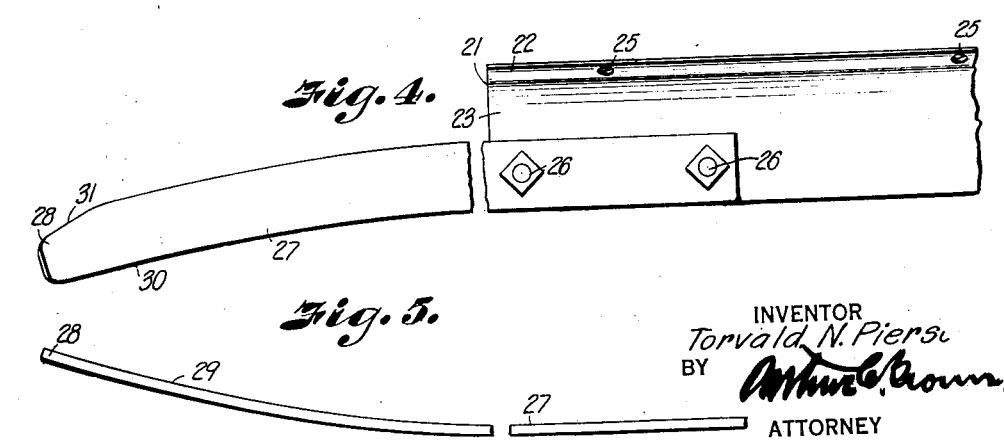
INVENTOR
Torvald N. Pierso[n]
BY
ATTORNEY Patented Aug. 28, 1934

1,972,031

UNITED STATES PATENT OFFICE 1,972,031

STRAW RETARDER

Torvald N. Pierson, Independence, Mo., assignor, by mesne assignments, to Gleaner Harvester Corporation, Independence, Mo., a corporation of Delaware Application February 11, 1929, Serial No. 339,235

11 Claims. (Cl. 198—213)

My invention relates to harvesting machines and more particularly to conveying mechanism for delivering cut grain to the threshing and separating elements of the machine, the principal objects of the invention being to retain the cut grain in guided relation with the conveyor, to prevent entanglement of the grain about the conveyor shaft, and to guide the grain into the cylinder feed spiral of the conveyor.

In accomplishing these and other objects of the invention, I have provided improved details of structure the preferred forms of which are illustrated in the accompanying drawing, wherein:

Fig. 1 is a plan view of the cutting mechanism of a harvesting machine equipped with conveying apparatus constructed in accordance with my invention.

Fig. 2 is a cross sectional view through the same on the line 2—2, Fig. 1.

Fig. 3 is an enlarged section through the grain retard and guide member.

Fig. 4 is an enlarged plan view of the discharge end of the retard member illustrating the finger for guiding the straw into the cylinder feed spiral of the conveyor.

Fig. 5 is a side view of the guide finger.

Referring in detail to the drawing:

1 designates the grain cutting mechanism of a standard combine harvesting machine including a trough-shaped grain pan 2 of substantially semi-circular cross-section, including a feeder housing at one end indicated at 2', a sickle bar 3 attached to the forward edge 4 of the grain pan, and a reel 5 for reeling the standing grain into contact with the sickle and causing the cut grain to fall into the grain pan.

Rotatably mounted in bearings 6 and 7 in the end plates 8 and 9 of the grain pan is the shaft 10 of a screw conveyor 11 adapted for delivering cut grain toward one end of the grain pan for discharge through an opening 12 in the side of the pan into a threshing cylinder 13.

Fixed on the shaft 10 at the discharge end of the conveyor is a second spiral 14 of gradually increasing diameter wound between the convolutions of the screw 11 and terminating adjacent the end 8 of the grain pan in a radial blade 15, adapted for receiving grain from the conveyor screw and discharging it into the threshing cylinder, the initial diameter of the spiral 14 being less than that of the conveyor screw and blade 15 longer than the diameter of the screw.

The conveyor shaft 10 projects through the end 8 of the pan and carries a sprocket 16 actuated from a similar sprocket 17 on the cylinder shaft 18 by a chain 19 running over the sprockets so that the conveyor screw 11 and feeding spiral 14 are driven from the cylinder, which is driven from a source of power (not shown).

As cut grain fed to a spiral conveyor of this type when carried upwardly along the rear wall 20 of the grain pan, tends to feed back onto and wrap about the screw, thereby interfering with feed to the threshing cylinder, I have provided the following described means for retarding such upward movement of the grain.

Fixed along the rear side of the grain pan is an angle-shaped bar 21 comprising a vertical leg 22 and a leg 23 inclined from the vertical leg. The inclined leg projects toward the conveyor, terminating short thereof and is supported by bolts 24 which are projected through openings 25 in the bar and similar openings in the pan, the bar being supported in substantially the horizontal plane of the shaft.

The bar preferably terminates short of the opening in the grain pan and fixed to the inclined leg by bolts 26 is a guide finger 27 projecting from the end of the bar to substantially the edge of the opening 12.

The guide finger comprises a bar-shaped member having its free end 28 curved upwardly as at 29 and toward the conveyor as at 30. The free end of the finger is preferably clipped on its rear edge as at 31 and the corners rounded to prevent the lodging of the straw thereon.

Assuming the parts to be constructed and assembled as described, the operation is as follows:

As the machine moves forwardly through a field of standing grain, the grain is swept to the sickle bar by the reel and cut grain received in the grain pan where it is picked up by the conveyor and propelled toward the end of the conveyor from where it is delivered to the threshing machine. Due to the direction of rotation of the screw conveyor the straw tends to climb up the rear side wall of the grain pan but is intercepted by the bar 23 and propelled through the space 32 formed between the bar and the wall of the grain pan until it encounters the guide finger 28 whereby it is compressed into the helical feeder and thereby discharged into the threshing cylinder.

What I claim and desire to secure by Letters Patent is:

1. In combination with grain cutting mechanism including a grain pan having a discharge opening, a screw conveyor rotatably mounted in the pan, and means for discharging grain through the discharge opening, a bar extending longitudinally of the pan adjacent the conveyor and spaced from said discharge means for retarding movement of grain about the conveyor and having means for directing the grain into said discharge means.

2. In combination with grain cutting mechanism including a grain pan having a discharge opening, a screw conveyor rotatably mounted in the pan, and means on the conveyor for discharging grain through the discharge opening, a retard member arranged longitudinally in the pan for preventing grain from winding about the conveyor and comprising an angle bar having a leg fixed to the pan and a leg extending into the pan and forming a pocket substantially coextensive with the pan through which the grain is conducted by the conveyor to the discharging means.

3. In grain cutting mechanism including a grain pan having a discharge opening, a screw conveyor rotatably mounted in the pan, and means on the conveyor for discharging grain through the discharge opening, a guide finger supported in the pan and curved upwardly and outwardly toward the discharge means for directing grain into said discharge means.

4. In grain cutting mechanism including a grain pan having a discharge opening, a screw conveyor rotatably mounted in the pan, means on the conveyor for discharging grain through the discharge opening, a bar fixed in the pan and projecting toward the conveyor for preventing movement of grain about the conveyor and a curved finger on the end of the bar for directing the grain into said discharging means.

5. In a device of the character described including a pan having a discharge opening, a screw conveyor rotatably mounted in the pan for conveying a material along the pan, and means on the conveyor cooperating with flights of the screw for discharging the grain through the opening, means extending longitudinally of the conveyor for preventing material conveyed by the conveyor from winding around the conveyor, and means for directing the material into said discharge means to be discharged through said opening.

6. In a device of the character described, a pan having a bottom and side portions, a screw conveyor rotatably mounted in the pan for conveying material along the pan, a retard member substantially coextensive with the screw conveyor and extending longitudinally of said side portion for retaining material in feeding relation with the screw and below said retard member during its travel along the pan, and means for rotating the screw conveyor whereby flights of the screw move material across the bottom of the pan and upwardly under said retard member for retention between the conveyor and said side portion.

7. In a device of the character described including a pan having a discharge opening, a screw conveyor rotatably mounted in the pan for conveying material along the pan, means on the conveyor cooperating with flights of the screw for discharging the material through the discharge opening, a guard member extending longitudinally of the pan to prevent grain from winding around the screw conveyor, and a finger on the guard member for directing the material into the said discharge means.

8. In apparatus of the character described including a pan having bottom and side wall portions and provided with a discharge opening at one end thereof, and a screw rotatable in the pan for conveying straw therealong toward said opening, a straw guard member extending along said side wall portion from a point adjacent the other end of the pan toward said opening and having a lower side cooperating with the side wall portion for retaining the straw in conveying relation with the screw and preventing the straw from winding about the screw, and means for rotating the screw toward the lower side of the guard member.

9. In a grain cutting mechanism including a grain pan, and a screw conveyor rotatably mounted in the pan for conveying grain along the pan, a guard member associated with the pan and extending longitudinally and coextensively therewith for retaining the grain in guided relation with the screw conveyor during its travel along the pan.

10. In a grain cutting mechanism, a grain pan, a screw rotatably mounted in the pan, a bar member cooperating with the pan to form a pocket coextensive with the conveyor to receive the grain during its travel along the pan and for preventing the grain from winding about the conveyor.

11. In a grain cutting mechanism including a conveyor pan, and a screw conveyor rotatably mounted in the pan for conveying straw along the pan, a guard member for retaining straw in guiding relation with the screw comprising an angle bar extending the length of the pan and parallel with the screw conveyor, having a leg fixed to the pan and a leg extending at an incline into the pan to a point adjacent the screw conveyor, and cooperating with the wall of the pan to form a pocket substantially coextensive with the pan through which straw is conducted by the conveyor.

TORVALD N. PIERSON.